US006826272B1

United States Patent
Dalrymple et al.

(10) Patent No.: US 6,826,272 B1
(45) Date of Patent: Nov. 30, 2004

(54) METHOD AND APPARATUS FOR INTEGRATED MULTIMEDIA CALL CONTROL

(75) Inventors: William Clyde Prentis Dalrymple, Cary, NC (US); Ta-Ming Chen, Cary, NC (US); Robert Donald Monroe, Jr., Cary, NC (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/164,885

(22) Filed: Oct. 1, 1998

(51) Int. Cl.[7] .......................... H04M 7/00; H04L 12/26; H04L 12/66; H04J 3/12
(52) U.S. Cl. ........................... 379/220.01; 379/221.02; 370/237; 370/352; 370/522
(58) Field of Search ................................ 370/237, 352, 370/522; 379/221.02, 220.01

(56) References Cited

U.S. PATENT DOCUMENTS 5,452,350 A * 9/1995 Reynolds et al. ...... 379/220.01
6,064,653 A * 5/2000 Farris
6,243,398 B1 * 6/2001 Kahane et al. .............. 370/522
6,292,479 B1 * 9/2001 Bartholomew et al.
6,292,553 B1 * 9/2001 Fellingham et al.

* cited by examiner

Primary Examiner—Ahmad F. Matar
Assistant Examiner—Thjuan P Knowlin
(74) Attorney, Agent, or Firm—Withrow & Terranova, PLLC

(57) ABSTRACT

Method and apparatus for integrated multimedia call control. A unified way to manage incoming calls is provided for users who have both a public switched telephone network (PSTN) telephone and a computer workstation with a multimedia data communications client such as a client specified in International Telecommunication Union (ITU) Standard H.323. Calls from a PSTN phone in the network can be routed either to the user's PSTN telephone or the audio handling portion of the user's multimedia data communications client software. The audio portion of calls from a multimedia data communication client in the network can be routed either to the user's PSTN telephone or to the audio portion of the user's multimedia data communication client. Users can thus control PSTN and multimedia internet telephony calls in a consistent manner.

26 Claims, 8 Drawing Sheets

METHOD AND APPARATUS FOR INTEGRATED MULTIMEDIA CALL CONTROL

BACKGROUND

1. Field of the Invention

This invention is related to computer telephony integration. In particular, this invention relates to a unified way of managing incoming calls, whether they arrive via internet telephony or the public switched telephone network (PSTN). Using this invention a computer user can choose, either in advance or in real time, to receive calls in various ways regardless of whether the call is coming in via the PSTN or via a multimedia data connection.

2. Description of the Problem Solved

Until recently, voice telecommunications and data telecommunications have been largely separate to most computer users. Increasingly, computer users run applications which include integrated multimedia communications. These systems generally include voice capability, where the voice communication path is terminated by the user's personal computer. Such a system makes use of voice data conversion such as voice-over-internet protocol or internet telephony. However, for reasons of voice quality, service availability, and compatibility, most users also maintain standard telephone customer premises equipment (CPE) for use with the PSTN.

Integration between data and high quality PSTN voice is highly desirable. A system which provides integration between multimedia telephony applications and high-quality PSTN voice services is described in patent application Ser. No. 065,124, filed Apr. 23, 1998, entitled "Integrated Telecommunication Collaboration System," which is assigned to the assignee of the present invention, and which is incorporated herein by reference. The system described in the patent application allows high-quality PSTN voice communications to work together with multimedia data communications to provide integrated collaboration between parties from within desktop applications. However, audio is always handled via a PSTN connection in a collaborative or harmonized call, and any PSTN audio is always received through a PSTN telephone. What is needed is a way to provide users with the ability to choose to handle any kind of incoming call either through a standard PSTN telephone, or through a headset or handset which is connected to a multimedia data communications client.

SUMMARY

The present invention solves the above problems by allowing users to control incoming PSTN and multimedia internet telephony calls in a consistent manner. The invention allows users to use multiple devices together during a call or set of calls. The invention can monitor the media channels being used within a call and route them to separate devices appropriate for the type of media to be passed. Users can specify whether they wish to receive calls over their PSTN phone only, telephony client software on a workstation only, or some combination, regardless of whether the incoming call originated via an Internet telephony client or through the PSTN. The distinction of whether the calls are from a telephony client or the PSTN telephone is hidden from the user, thus providing a consistent mechanism for incoming call management. The invention also addresses the situation where a user has combination of voice terminals and data terminals and wants the flexibility to use multiple devices in a single call.

The invention works by either re-routing a public switched telephone network call to a user multimedia client which handles multimedia data calls with an audio portion, or re-routing the audio portion of multimedia data call from a network multimedia client to a user's PSTN telephone. In the preferred embodiment, the invention is implemented by a call processor, a gateway, and a user proxy, all disposed near the user. The system is connected to a PSTN switch which includes a computer telephony interface. In order to route to a PSTN call to user multimedia client capable of handling multimedia calls with an audio portion, the system described above first receives a call offered notification and checks for routing instructions from the user. The system then sends a redirect call request and an alerting message to the PSTN switch. Finally the system connects the PSTN call as the audio portion while the multimedia call being received by the user multimedia client. The routing instructions can be stored in the user proxy, or can be specified in real-time by the user.

In the case where a call is being placed by a multimedia data client in the network to the user, the system determines routing instructions as described above, and routes the audio portion of the call to the users PSTN telephone if required. The system first must establish a location and a destination number for the telephone. The system then establishes a PSTN audio connection between the network multimedia client and the user PSTN telephone. Since the call is being originated by a multimedia data client in the network, in most cases the call also has data portion, which must be transferred to the user multimedia client. In addition to the scenarios described above, an audio portion of a call can be switched mid-stream by detection of an off-hook notification.

The invention is deployed in the network which includes apparatus for handling multimedia calls. Such multimedia call has an audio portion and a data portion. The network includes a PSTN switch which has a computer telephony interface. A plurality of user devices are disposed at the user location, including a telephone connected to the PSTN switch. The call processor, gateway, and user proxy in most cases, are connected to each other and to at least some of the user devices via a local area network. The gateway is typically connected to the PSTN switch.

The software which implements many aspects of the present invention can be stored on a media. The media can be magnetic such as diskette, tape or fixed disk, or optical such as a CD-ROM. Additionally, the software can be supplied via the Internet or some type of private data network. Workstations which typically run the client software include a plurality of input/output devices, a connection for a network and a system unit which includes both hardware and software necessary make the invention work.

DETAILED DESCRIPTION OF A PREFERRED EMBODIMENT

Figure 1:
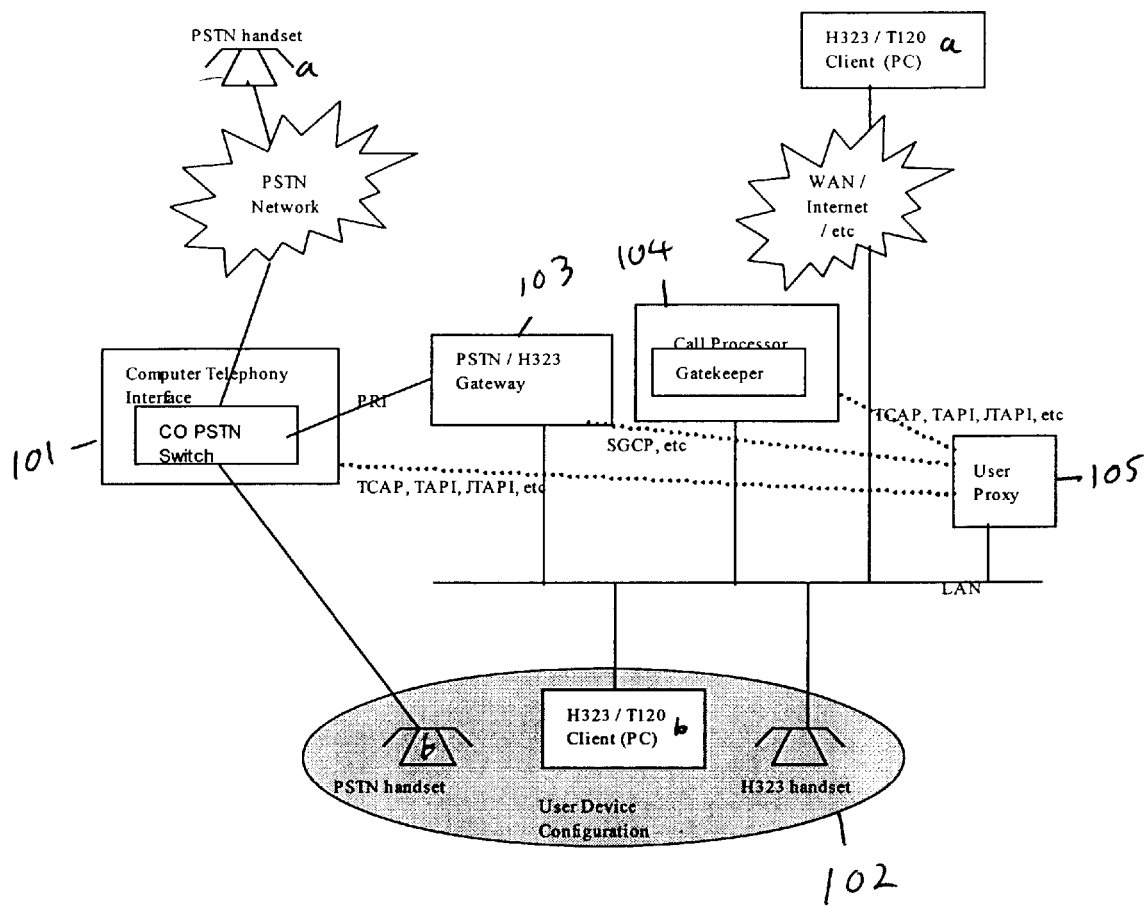
FIG. 1 is a network diagram which illustrates the operating environment and the architecture of the present invention.

FIG. 1 provides a view of the network architecture used by this invention. It should be noted that the components within the diagram are logical components which may or may not be implemented within actual processor boundaries. Some or all of the elements may be combined into a single processor. For example, the call processor may actually be combined into the gatekeeper, and computer telephony interface may actually be combined into the PSTN switch. Throughout this disclosure, we refer to a user client and a user telephone. By the term user, we mean devices which are included in the user device configuration 102 of FIG. 1. Throughout this disclosure, we also refer to a network client and a network telephone. By the term network, the refer to devices or elements which are located away from the user device configuration, that is, in the PSTN or a public data network such as the Internet.

This invention works where either the user device configuration, or a caller within the network or networks is using a multimedia data communications platform. Such a multimedia data communications platform typically provides for multimedia calls having an audio portion and data portion. Such a platform also typically provides for application sharing. By way of example we have described our invention in terms of the well-known data communications platform specified in international telecommunication union (ITU) standard H.323, published November, 1996, which is incorporated herein by reference. The application sharing portion of this standard is referred to as ITU standard T.120. H.323 encompasses multiple other standard protocols. For example, H.225 is used for call control signaling in H.323 calls, H.245 is used to control the media logical channels, and T.120 can be used to specify multimedia prototcol within the context of a specific H.245 logical channel. It will be readily understood by the skilled in the art that the invention is applicable to any network architecture in which a multimedia data communications platform having the basic characteristics of H.323 is used.

Network Architecture

The call processor 104 of FIG. 1 provides call processing extensions and is responsible for distributing H.323 related call progress notifications to all user proxies registered to it, and processing H.323 related call requests on behalf of user proxies. The call processor relies on user proxies and/or other registered services to make all the call processing decisions. User proxies are described below. The call processor 104 only takes default action in the cases where no user proxies/services are registered or where there is a timeout while waiting for a response from a user proxy or service. Call processors can use any number of potential call distribution protocols as the protocol between the user proxies and the call processor. Examples of suitable distribution protocols include Transaction Capabilities Application Part (TCAP) which is used extensively in SS7 networks, Telephony Application Programming Interface (TAPI), and Java Telephony Application Programming Interface (JTAPI). The actual protocol used between the call processor and user proxies is not important as long as it supports the functions required as described in the message sequence charts which are used to illustrate the invention.

Call processor 104 allows distributed services to register for specific H.323 call events and to provide the intelligence required for routing calls. When the call processor receives H.323 call progress messages from the gatekeeper (described below), it notifies the appropriate registered user proxies and stops processing of that call (condenses) until a request message is sent back from a user proxy telling the call processor how to proceed with the H.323 call or until a timeout occurs. The call processor provides the same function as the computer telephony interface 101 but for H.323 calls.

User proxy 105 is a persistent representation of a user of this invention and provides most of the intelligence required for call routing. In the preferred embodiment, the user proxy 105 is configured by the user via a browser interface with call routing and device options that are used to handle call management functions on behalf of a specific user. The user proxy is registered with both the call processor and the computer telephony interface 101 and receives all call notifications and processes all call requests (PSTN and H.323) on behalf of a single user. The protocol used between the user proxy and the call processor 104 or the computer telephony interface 101 can be TCAP, TAPI, JTAPI, or some proprietary protocol as long as it supports the requirements documented in the message sequence charts. The user proxy maintains an understanding of all the devices available to the user and is responsible for ensuring proper call routing among them as provisioned by the user. There is only one user proxy for each registered user of this invention. A single user proxy can manage multiple calls (PSTN, or H.323) on multiple devices all related to a specific user.

The PSTN handsets a and b in FIG. 1 are regular telephones connected to the public switched telephone network (PSTN). The H.323 handset in FIG. 1 is a physical device that looks and acts like a normal PSTN telephone but includes an H.323 protocol stack and is connected directly to an IP network as opposed to the PSTN. These devices are H.323 endpoints and are referred to in the H.323 specification as terminals. The H.323/T.120 client PC's represent computers which are connected to a data network and are running H.323 compatible client software and optionally have T.120 data sharing capability and/or video capability. They are H.323 endpoints and are also referred to in the H.323 specification as terminals. Details of the construction of a PC or workstation and how it executes software are described later in this disclosure.

The computer telephony interface 101 is responsible for ensuring that the appropriate user proxy is notified of all PSTN call notifications associated with the user's PSTN handset. The computer telephony interface 101 provides the same function as the call processor 104 but for PSTN calls. The computer telephony interface is responsible for processing all PSTN call requests (in conjunction with its associated central office (CO) PSTN switch) to perform all the required PSTN call control. Note that this interface may be directly integrated as part of the specific CO PSTN switch or it may be a separate processor connected to the CO PSTN switch via an ISDN PRI or data (X.25, etc) interface. The protocol between the computer telephony interface and user proxies can be TAPI, TCAP, JTAPI, etc. The actual protocol used is not important as long as it supports the functions required as described in the message sequence charts. The computer telephony interface allows services distributed on the network to register for specific PSTN call events and to provide the intelligence required for routing calls. When the computer telephony interface receives call progress messages from the CO PSTN switch, it notifies all registered user proxies and stops processing of that call (condenses) until a request message is sent back from a user proxy telling the computer telephony interface how to proceed with the call or until a timeout occurs. FIG. 1 shows the computer telephony interface co-located with a CO PSTN switch. This relationship is functional only. The switch represents a local central office to which the PSTN handset of the user of the invention is connected. The switch may be a PBX residing at the customer premises. The main requirement for this component is that it route PSTN calls to and from PSTN handsets and it must also accept requests from and send call progress notifications to the computer telephony interface (either via a PRI or data interface).

The PSTN/H.323 gateway 103 is responsible for the translation of H.323 transmission formats and communications procedures such that H.323 calls can be connected to PSTN calls. Depending on the specific gateway used and the specific protocol used between the user proxy, call processor, and the computer telephony interface, there may be a need for a separate application programming interface (API) between the gateway 103 and the user proxy 105, such as simple gateway control protocol (SGCP) or IP device control protocol (IPDC), so that the user proxy can ensure proper call routing through the gateway. This disclosure includes an example API within the message sequence charts for completeness. The successful routing of calls through the gateway is what is important to this invention and not which interface is used.

The gatekeeper is shown co-located with the call processor for functional purposes only. The gatekeeper is responsible for the admissions control, address translations, and bandwidth management within the user's zone. In the preferred embodiment, the gatekeeper uses gatekeeper routed call signaling as defined in the ITU H.323 specification and ensures all call progress messages are routed through the call processor for distribution to the user proxy and services.

The user device configuration 102 includes any combination of communication devices. The device configuration shown in the figure is just one example of devices a user may have. In this case, a user has a PSTN handset, an H.323 handset, and an H.323 client running on a PC.

Functional Overview of Messaging

This invention allows for flexible PSTN/H.323 call routing functions. The preferred embodiment of this invention assumes, for illustrative purposes, the use of published ITU standards such as H.323, H.225 , H.245, and T.120 for communication between H.323 endpoints, and known standards such as TCAP, TAPI, TSAPI, JTAPI, etc. as previously described for communication between the call processor and the user proxies and between the computer telephony interface and the user proxies. The following message sequences attempt to focus on the additions and variations to the standards which are relevant to this invention. Therefore, some of the well-known message sequences which are already documented within published specifications are condensed into a single bi-directional message indicated with an arrow showing a title of the sequence. Further description is included in this disclosure if it is required to provide full operational context of the invention. Some other well-known message sequences are not included here but are assumed to have been sent in the appropriate places as documented in the appropriate specifications.

The new messages introduced by this invention between the user proxy and the call processor, and between the user proxy and the computer telephony interface within the scenario descriptions (and in the message sequence charts) are examples of the collaboration between the entities and are not intended to represent a specific protocol. Instead, the intent of the messages is what is important to this disclosure. As mentioned earlier, the actual protocol between these entities could be TCAP, TAPI, TSAPI, JTAPI, or some other proprietary protocol.

The described scenarios are written assuming that fast connect and H.245 tunneling are not used. However, the invention can be used even in fast connect scenarios where H.245 tunneling is used. The main difference is that the H.245 message sequences described would happen sooner in the fast connect scenarios, but the basic interactions between components would remain roughly the same.

Routing a PSTN Call to an H.323 Handset

Figure 2:
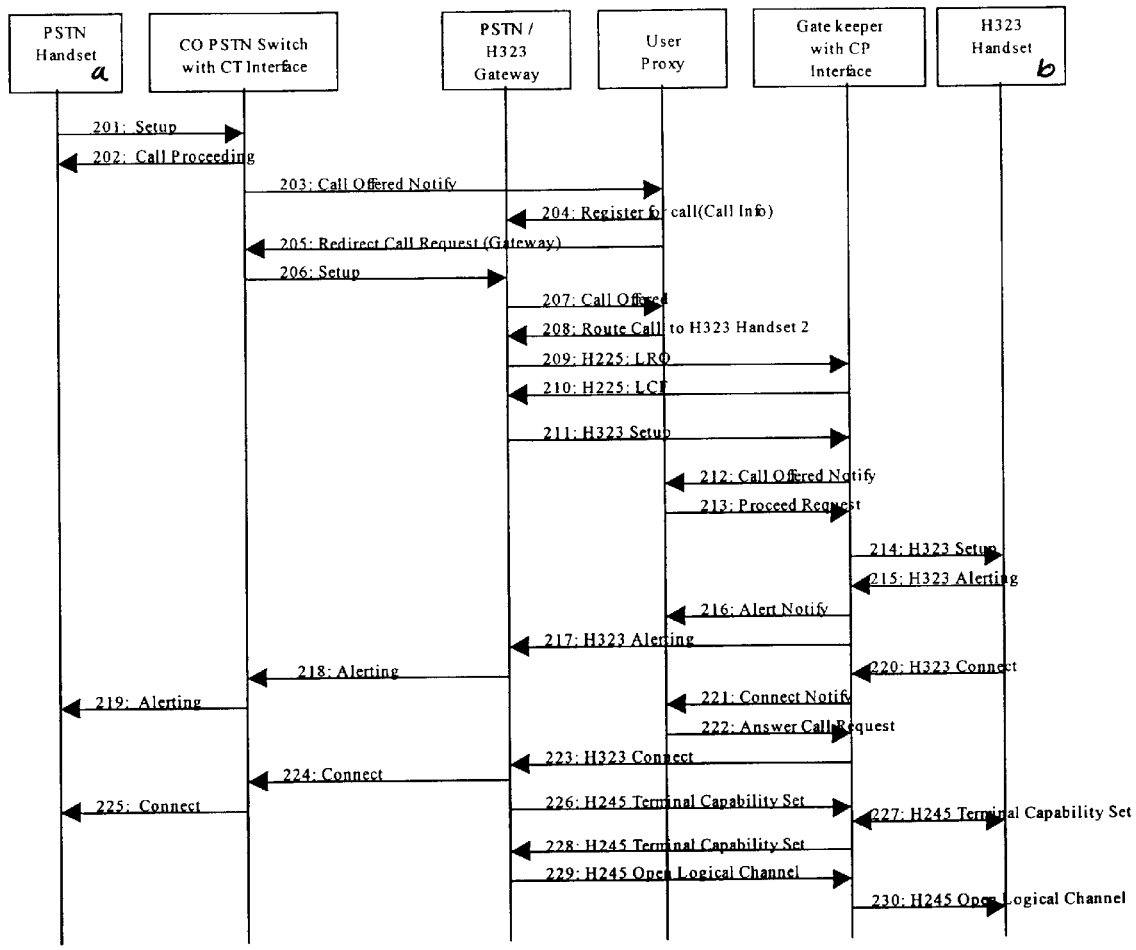
FIG. 2 is a message sequence chart which illustrates how a PSTN call is routed to a user multimedia data client handset according to the present invention.

FIG. 2 describes the interactions between the architecture entities required to perform a routing from an incoming network PSTN call, through the gateway to the user's H.323 handset. The sequence begins when a call is initiated from the network PSTN handset a by lifting the handset and dialing the directory number (DN) for the user's PSTN handset b. A setup message 201 is delivered to the CO PSTN switch. The CO PSTN switch responds with a call proceeding message 202. The computer telephony interface notifies the user proxy at 203 that there is a call about to be offered to it's PSTN handset.

The user proxy checks with its user configuration database and determines that the user has provisioned routing instructions dictating that all incoming PSTN calls are to be routed to the user's H.323 handset. Since the user proxy will be redirecting the call to the gateway, it notifies the gateway that the user proxy is to be notified when the specific call reaches the gateway. This is accomplished by sending a register for call message 204 to the gateway and indicating specific call information such as redirecting number, calling number, etc. The user proxy initiates the rerouting by sending a redirect call request message 205 to the computer telephony interface on the CO PSTN switch indicating that the call should be redirected to the gateway.

The CO PSTN switch redirects the call to the gateway DN by sending a setup message 206 to the gateway. Once the gateway receives the setup message, it checks to see if any user proxies have registered for notification of this call. The gateway notifies the registered user proxy by sending a call offered notify message 207 to the user proxy. Upon receipt of the call offered notify message, the user proxy replies with a route call request message 208 to the gateway instructing the gateway to route the call to the user's H.323 handset by specifying an alias identification in the route call message indicating a user ID and a device ID.

Note that there could be optimizations which would allow the call to be rerouted through the gateway without having to involve the user proxy. One way would be to have separate DN's registered on the gateway which represent individual H.323 clients and H.323 handsets. This would eliminate the need of notifying the user proxy when the call reaches the gateway and would allow the gateway to automatically continue on to find the appropriate H.323 endpoint on its own. While this solution would be more efficient, it increases the cost of implementation since there is typcially a charge per DN used. Standardized gateway protocols such as SGCP or IPDC should be considered for use by the user proxy when controlling the gateway routing functions.

Once the gateway has a destination alias identifier for the user and the device, it attempts to find the call signaling transport address for the destination endpoint by initiating the location request (LRQ) message 209 with the gatekeeper and passing the alias in the message. The gatekeeper replies to the LRQ message by sending back a location confirmation (LCF) message 210 which contains the call signaling transport address in the call processor which the gatekeeper associates with the user proxy. The call processor maintains this association between the call signaling channel and the user proxy so that it can send the call progress messages to the appropriate user proxy.

The gateway sends a setup message 211 directly to the call signaling channel on the gatekeeper/call processor which was returned in the LCF message. The call processor informs the user proxy of the incoming setup by sending a call offered message 212 to the appropriate user proxy. The user proxy responds by sending a proceed message 213 back to the call processor informing it that the call should proceed and terminate to the H.323 handset.

The gatekeeper proceeds with the call setup by forwarding the call setup message 214 on to the call signaling channel of the user's H.323 handset. The user's H.323 handset responds with an alerting message 215. The call processor on the gatekeeper notifies the user proxy that the terminal is alerting by sending it an alert notify message 216. The call processor routes the alerting message on to the gateway at 217. The gateway translates the alerting message and forwards it on to the CO PSTN switch at 218, and the switch passes it along to the PSTN handset a at 219.

Once the user answers the call by lifting the H.323 handset, a connect message 220 is sent to the gatekeeper. The call processor notifies the user proxy of the connect message by sending a connect notification message 221. The user proxy replies with an answer call request message 222 back to the call processor on the gatekeeper indicating to the call processor that the connect should be forwarded back to the originator. The gatekeeper includes its own H.245 control channel in the connect message to ensure that it is involved in the H.245 control signaling. The gatekeeper forwards the connect message 223 back toward the gateway. The gateway translates the message and forwards the message on to the CO PSTN switch at 224 and the switch propagates it to the PSTN handset a at 225.

Figure 3:
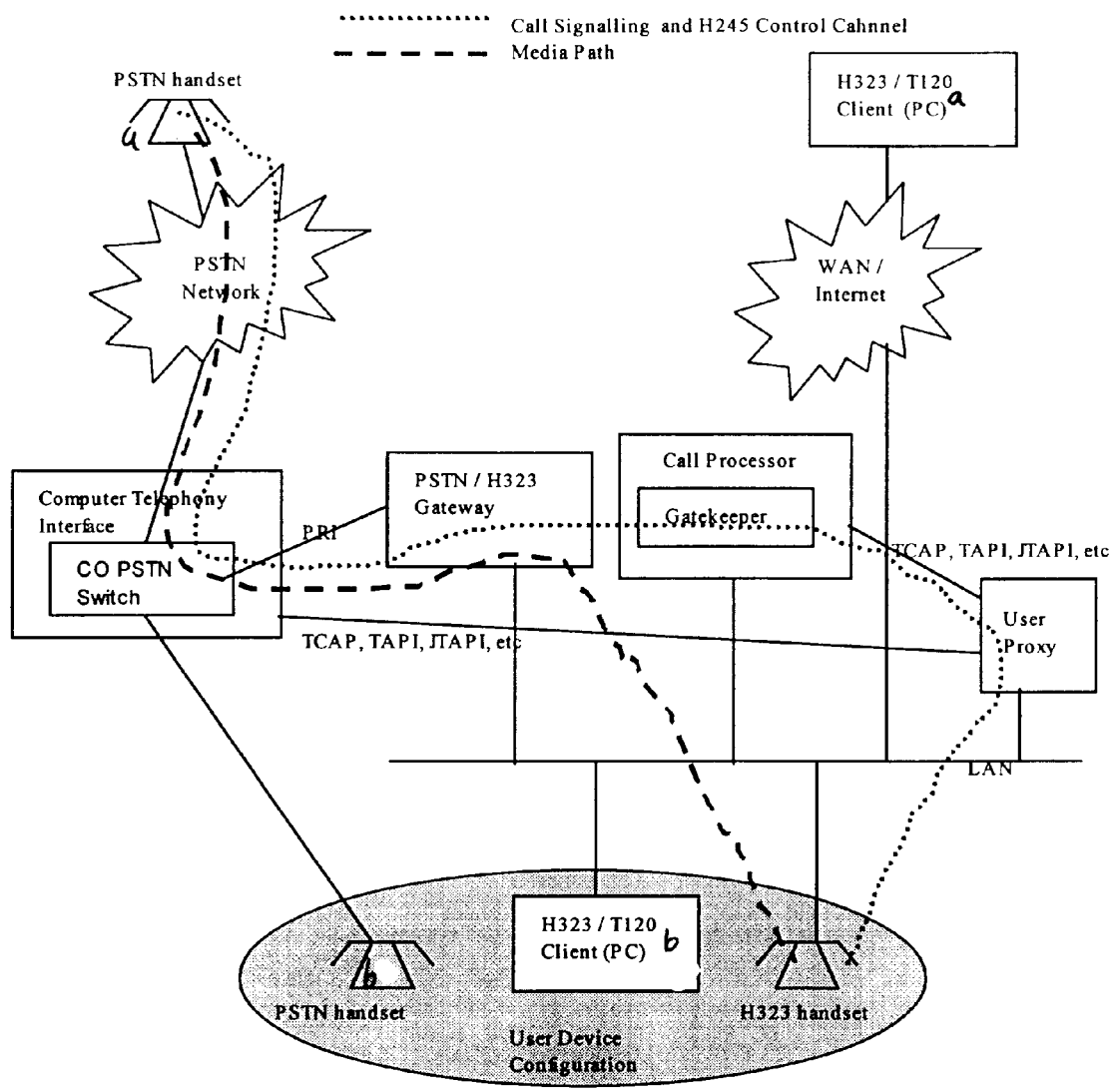
FIG. 3 is a diagram which shows the signaling paths used by the present invention when a PSTN call is routed to a user multimedia data client handset.

Once the connect message has been propagated all the way back to the originator, the H.245 negotiation for capability begins. The gateway sends a terminal capability set message 226 to the gatekeeper. Capability information is exchanged between the gatekeeper and the H.323 handset at 227. The gatekeeper responds back to the gateway with a terminal capability set message 228. The opening of H.245 logical channels begins by sending H.245 open logical channel messages 229 through the gatekeeper to the H.323 handset b at 230. Note that either side can begin the opening of H.245 logical channels. The important aspect here is that the gatekeeper is involved with the routing of the H.245 control messages. FIG. 3 illustrates the signaling paths established by the messaging illustrated in FIG. 2.

Figure 4:
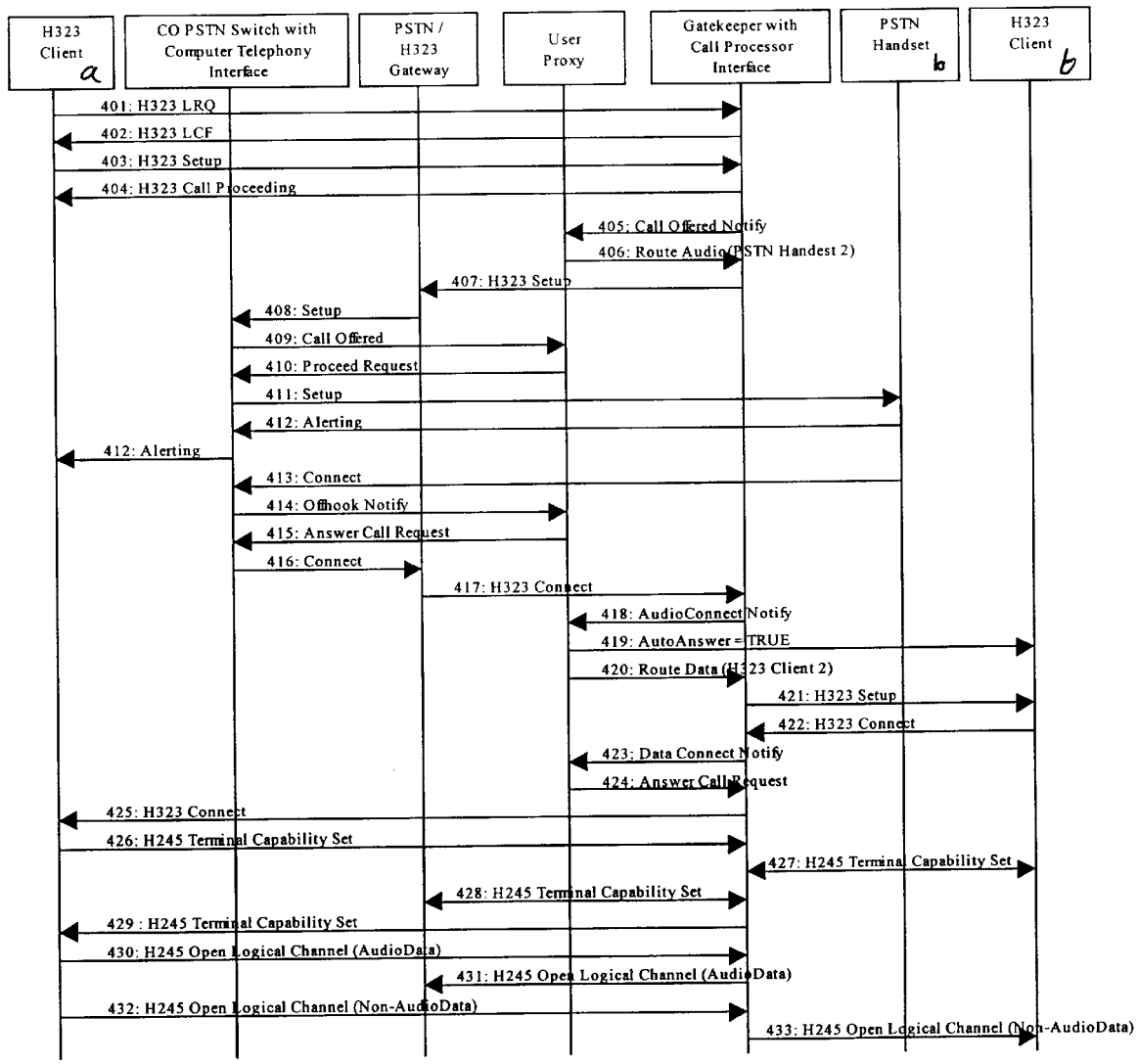
FIG. 4 is a message sequence chart which shows how an audio portion of a multimedia data call is routed to a user PSTN handset according to the present invention.

Routing the Audio Portion of a Network Multimedia Call to a User's PSTN Telephone while Routing the Data Portion to the User's Multimedia Data Communications Client FIG. 4 describes the interactions between the components of the system in order to route the voice of an incoming H.323 call to the user's PSTN handset and all other non-audio channels to the user's PC. The calling user is unaware of this separation since the gatekeeper, call processor, and the user proxy are performing the integration. The sequence begins when the calling H.323 client sends an LRQ request message 401 to the gatekeeper responsible for managing the zone in which the user of this invention is registered. Note that this LRQ message could have also been sent by the calling user's gatekeeper. The gatekeeper responds with an LCF message 402 which contains the call signaling transport address which represents the user on the call processor. The calling user's network H.323 client then sends a setup message 403 to the call processor via the call signaling transport address. Upon receipt of this message, the call processor immediately responds with a call proceeding message 404 back to the calling H.323 client. The call processor then proceeds to notify the user proxy that there is an incoming call by sending a call offered notify message 405 to the user proxy.

The user proxy either checks its provisioned data for routing instructions or interactively obtains the information directly from the user in real time. In this example, the user indicates that all audio traffic is to be routed to the user's PSTN handset b and all other traffic such as video, T.120, etc. should be routed to the H.323 client b. The user proxy begins the routing sequence by sending a route audio message 406 to the call processor and indicating that the audio should be sent to the PSTN handset b by including an identifier which uniquely identifies the handset in the message.

The call processor initiates routing of the audio to the handset by sending a setup message 407 to the gateway and specifying the DN of the PSTN handset b. The gateway responds by sending a setup message 408 to the computer telephony interface. The computer telephony interface notifies the registered user proxy that there is an incoming call destined for the user's PSTN handset by sending the user proxy a call offered message 409. The user proxy responds by sending a proceed request message 410 back to the computer telephony interface. The computer telephony interface then instructs the CO PSTN switch to continue with the call setup which equates to the CO PSTN switch forwarding the setup message 411 on to the user's PSTN handset b.

The user's PSTN handset b responds to the setup message by sending back an alerting message 412 to the originating handset via the CO PSTN switch while also ringing the actual handset. Once the user lifts the handset to answer the call, the PSTN handset sends a connect message 413 to the CO PSTN switch notifying it that the user has answered the call. The computer telephony interface notifies the user proxy that the PSTN handset b has gone off hook by sending an off-hook notify message 414 to the user proxy. The user proxy responds with an answer call message 415 instructing the computer telephony interface to connect the audio portion of the call. The CO PSTN switch sends a connect message 416 to the gateway which translates the connect message into H.323 format and forwards it on back to the call processor 417. When the call processor receives the connect message, it notifies the user proxy that the audio portion of the call has been connected by sending an audio connect notify message 418 to the user proxy.

The user proxy establishes a call to the user's H.323 client b for all non-audio media streams. Since the user has already answered the call by lifting the PSTN handset, the user proxy instructs the H.323 client b to auto answer so that no further action is required by the user to establish the data portion of the call. It accomplishes this by sending an autoanswer message 419 to the H.323 client. Upon receipt of the autoanswer message, the H.323 client sets itself up to auto answer an incoming H.323 call from the specific user.

The user proxy now initiates the call to the user's H.323 client b by sending a route data message 420 to the call processor and indicating that all non-audio channels are to be routed to the user's H.323 client b. The call processor establishes an H.323 call with the H.323 client b by sending it a setup message 421. Since the user's H.323 client b has already been configured to auto answer, it immediately responds with an H.323 connect message 422 back to the call processor. The call processor notifies the user proxy that the data portion has been answered by sending it a data connect message 423.

Now that both portions (audio and data) of the call have been connected, the user proxy instructs the call processor that it should notify the calling user that the entire call has now been answered. It accomplishes this by sending an answer call request message 424 to the call processor. The call processor then sends an H.323 connect message 425 back to the calling H.323 client. Once the call has been connected, the capability exchange is initiated. In this case, the calling H.323 client sends its capabilities to the call processor by sending it an H.245 terminal capability set message 426. The call processor needs to send its capability set also, but since there are two devices involved (the PSTN handset b via the gateway and the H.323 client b), the call processor needs to perform capability negotiation with each device via messages 427 and 428 and send a combined capability set to the calling H.323 client a. Once the call processor has the capability sets of the PSTN handset b and the H.323 client b, it creates a single capabilities set by combining the audio capabilities of the PSTN handset b with all the non-audio capabilities of the H.323 client b. The call processor sends the combined terminal capability set message 429 to the calling H.323 client to complete the capability negotiation process.

Figure 5:
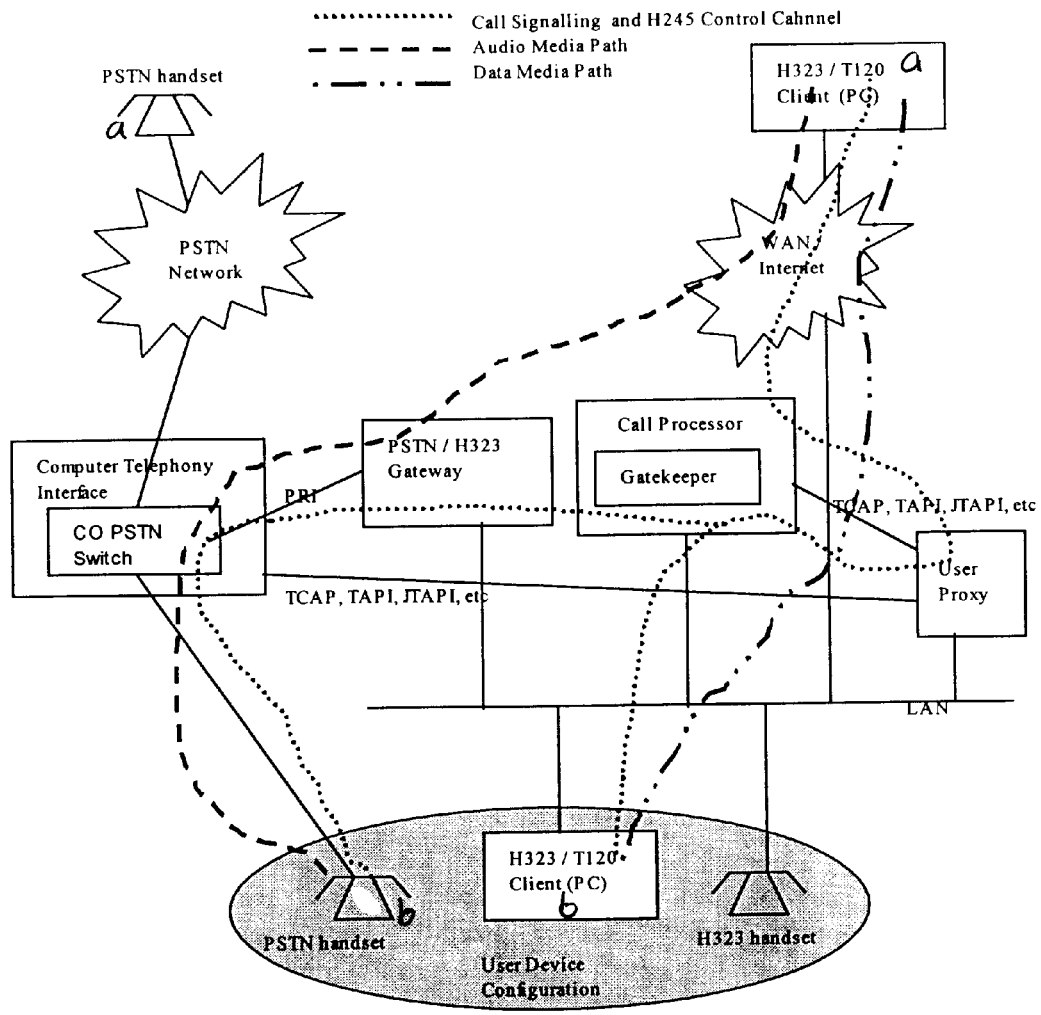
FIG. 5 is a diagram which shows the signaling paths used by the present invention when an audio portion of a multimedia call is routed to a user PSTN handset.

In this example, the calling H.323 client a initiates the opening of an H.245 logical channel for audio by sending an H.245 open logical channel request message 430 to the call processor and specifying an audio data type. The call processor checks the request and upon realizing it is a request to open an audio channel, forwards the message on to the gateway at 431. When the calling H.323 client wants to open a non-audio channel it sends another H.245 open logical channel message 432 with data type anything other than audio to the call processor which forwards it on to the user's H.323 client b at 433. FIG. 5 illustrates the signal paths that are now established as a result of the process illustrated in FIG. 4.

Figure 6:
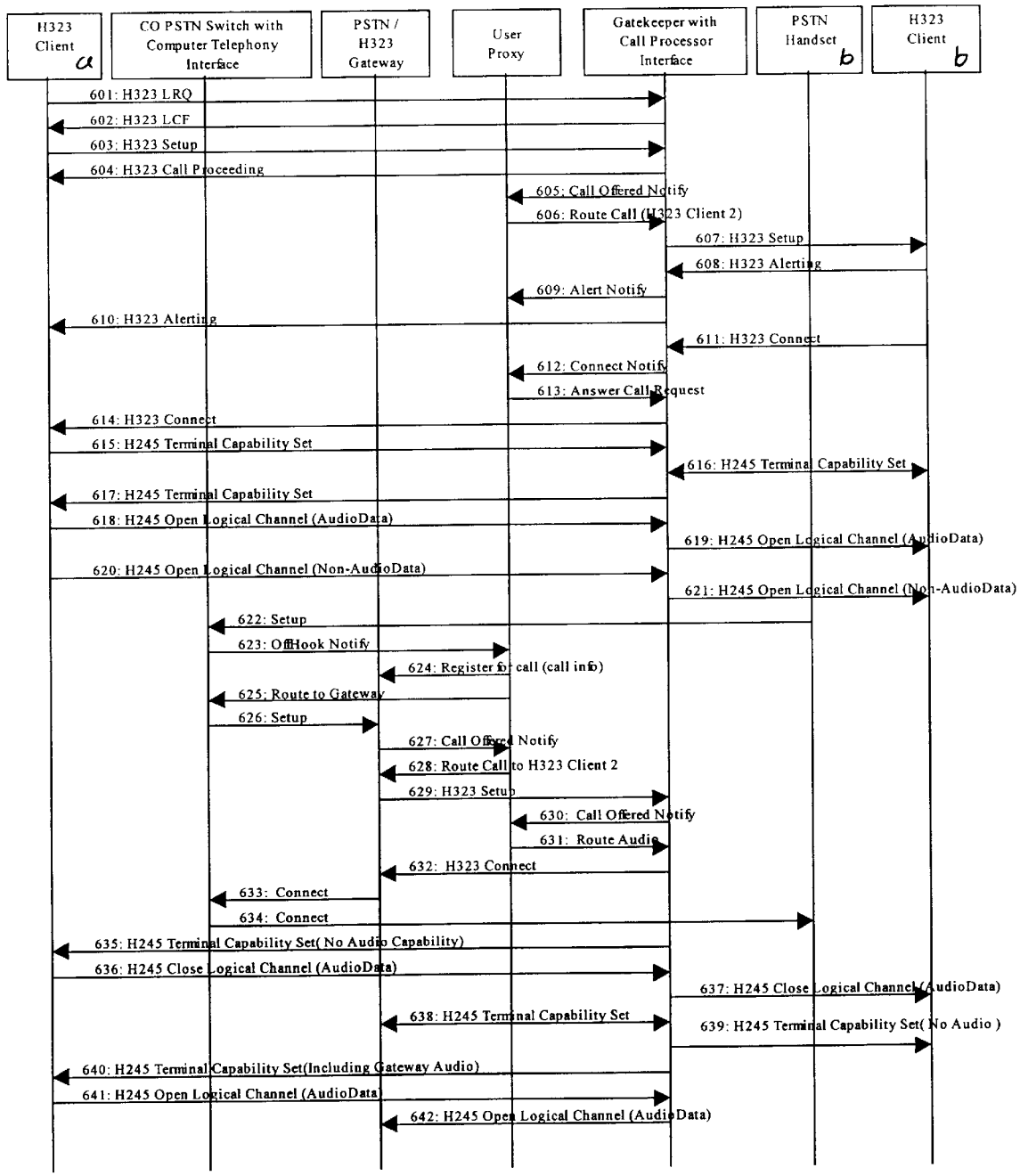
FIG. 6 is a message sequence chart which shows a mid-call re-routing of the audio portion of a multimedia call to a user PSTN handset according to the present invention.

Switching the Audio Portion of an In-Progress Multimedia Call from a User's Multimedia Data Communications Client to a User's to a User's PSTN Telephone FIG. 6 describes the interactions between the components in order to perform a mid-call rerouting of the voice from the user's H.323 client b to the user's PSTN handset while maintaining the non-audio data connections with the user's H.323 client b. The calling user is unaware of this operation since the gatekeeper, call processor, and the user proxy are performing the rerouting function.

The sequence begins when the calling or network H.323 client a sends an H.323 LRQ request message 601 to the gatekeeper responsible for managing the zone in which the user of this invention is registered. Note that this H.323 LRQ message could have also been sent by the calling user's gatekeeper. The gatekeeper responds with an H.323 LCF message 602 which contains the call signaling transport address on the call processor which represents the user. The H.323 client a sends an H.323 setup message 603 to the call signaling transport address on the call processor to initiate the call. The call processor responds with an H.323 call proceeding message 604.

The call processor notifies the user proxy that a call is about to be offered by sending it a call offered notify message 605. The user proxy checks its provisioned data to see how the user wants to receive calls. The user proxy determines that the call should be routed to the user's H.323 client b. The user proxy requests the call processor to route the call to the H.323 client by sending it a route call message 606 and specifying the H.323 client b as the destination within the message.

The call processor routes the call to the H.323 client b by sending it an H.323 setup message 607. The H.323 client b responds by sending an H.323 alerting message 608 back to the call processor. The H.323 client b could also send an H.323 connect message in the situation where it was set to auto answer the call. The call processor notifies the user proxy that the H.323 client b is alerting by sending it an alert notify message 609. This is done to allow the user proxy to stay in sync with the status of its devices. The call processor propagates the H.323 alerting message 610 back to the calling H.323 client a.

Once the user answers the call on the H.323 Client b, an H.323 connect message 611 is sent to the call processor. The call processor notifies the user proxy that the call has been answered by sending it a connect notify message 612. This gives the user proxy the flexibility of performing announcements which may be needed before actually connecting the two endpoints. However, in this scenario, the user proxy simply connects the endpoints so it sends an answer call request message 613 to the call processor. Upon receiving the answer call message, the call processor sends an H.323 connect message 614 back to the calling H.323 client a.

Before any channels can be opened, the endpoints must negotiate capabilities. In this scenario, the calling endpoint initiates this by sending an H.245 terminal capability set message 615 to the call processor via the call signaling transport address. The call processor completes the capability exchange with the H.323 client b with message 616 and responds to the H.323 client a with the capability set message 617.

The H.323 client a opens an audio channel sending an H.245 open logical channel message 618, with the datatype set to audio, to the call processor, which forwards it on to the H.323 client b at 619. An audio path is established between the two clients. The H.323 client a initiates the opening of a data channel (for application sharing, whiteboarding, file transfer, etc.) by sending another H.245 open logical channel message 620 with the datatype set to some form of data type such as T.120, to the call processor. The call processor forwards this message on to the H.323 client b as message 621 and a data channel is opened between the two clients.

The user now decides to pick up his/her PSTN handset b in an attempt to route the audio portion of the call to the handset. This results in a setup message 622 being sent to the CO PSTN switch. The computer telephony interface intercepts the setup before dialtone is sent to the handset, and notifies the user proxy that the handset has gone off-hook by sending it an off hook notify message 623. The user proxy interprets the off hook as a request to route the audio of the call which is currently on the user's H.323 client b, to the user's PSTN handset b. The interpretation of the off-hook notification message by the user proxy is configurable by the user. It can be configured to require user information be entered via the handset in order to determine the intent of going off-hook as opposed to automatically assuming it means to route audio to it from the current call.

Given that in this scenario, the user proxy should route the audio of the current call to the PSTN handset b, the user proxy routes the handset through the gateway to the call processor where the call is currently being served. The user proxy first notifies the gateway that it will be expecting a call and that it is to be notified when the call arrives. This is done by sending a register for call message 624 to the gateway and specifying such information as redirecting number, calling number, etc. The user proxy then requests the CO PSTN switch to route the call to the gateway by sending a route to gateway message 625) to the computer telephony interface. The call is routed to the gateway by sending a setup message 626. Upon receiving the setup message, the gateway checks and sees that the user proxy has registered to be notified of when the call has arrived. The gateway sends a call offered notification message 627 to the registered user proxy.

Note that there could be optimizations which would allow the call to be rerouted through the gateway without having to involve the user proxy. One way would be to have separate DN's registered on the gateway which represent individual H.323 clients and H.323 handsets. This would eliminate the need of notifying the user proxy when the call reaches the gateway and would allow the gateway to automatically continue on to find the appropriate H.323 endpoint on its own. While this solution would be more efficient, it increases the cost of implementation since there is a charge per DN used. Standardized gateway protocols such as SGCP or IPDC should be considered for use by the user proxy when controlling the gateway routing functions.

The user proxy continues with the routing by sending a route call request message 628 to gateway specifying the call signaling transport address of the user proxy's call on the call processor. The gateway sends an H.323 Setup message 629 to the call signaling transport address of the user proxy's call on the call processor. The call processor notifies the user proxy of the incoming call by sending the user proxy a call offered notify message 630. The user proxy now can direct the call processor to route the audio portion of the current call to the incoming call by sending it a route audio request message 631 containing the appropriate call id's to be connected.

The call processor first answers the call from the user's PSTN handset by sending an H.323 connect message 632 back toward the gateway. The gateway forwards the connect message to the user's PSTN handset and the call is considered answered. The call processor now needs to stop the audio portion of the original call between the H.323 client a and H.323 client b so that it can be rerouted to the PSTN handset. This is accomplished by sending an H.245 terminal capability set message 635 with the audio capability set to NULL to the H.323 client a. The H.323 client needs to close its audio channel since the received capability set indicates that there is no audio capability at the other end. The H.323 client a sends an H.245 close logical channel message 636 to the call signaling transport address on the call processor. The message specifies the channel number of the audio channel. The call processor forwards the close logical channel message 637 to the H.323 client b. Upon receiving this message, the H.323 client b closes the audio channel.

The call processor negotiates capabilities with the gateway at 638 and sends an H.245 terminal capability set message 639 to the H.323 client b specifying that the client should stop transmission of all audio. The call processor combines the non-audio capabilities of the H.323 client b with the audio capabilities of the gateway into a single H.245 terminal capability set message 640 and sends the message to the H.323 client a. The call processor maintains a knowledge of which devices have certain capabilities so that it can play a role with routing H.245 channel messages to the appropriate device.

Upon receiving the new terminal capability set which includes the new audio capabilities, the H.323 client b re-opens an audio channel by sending an H.245 open logical channel message 641 to the call signaling transport address on the call processor. The call processor forwards the H.245 open logical channel message 642 to the gateway.

Figure 7:
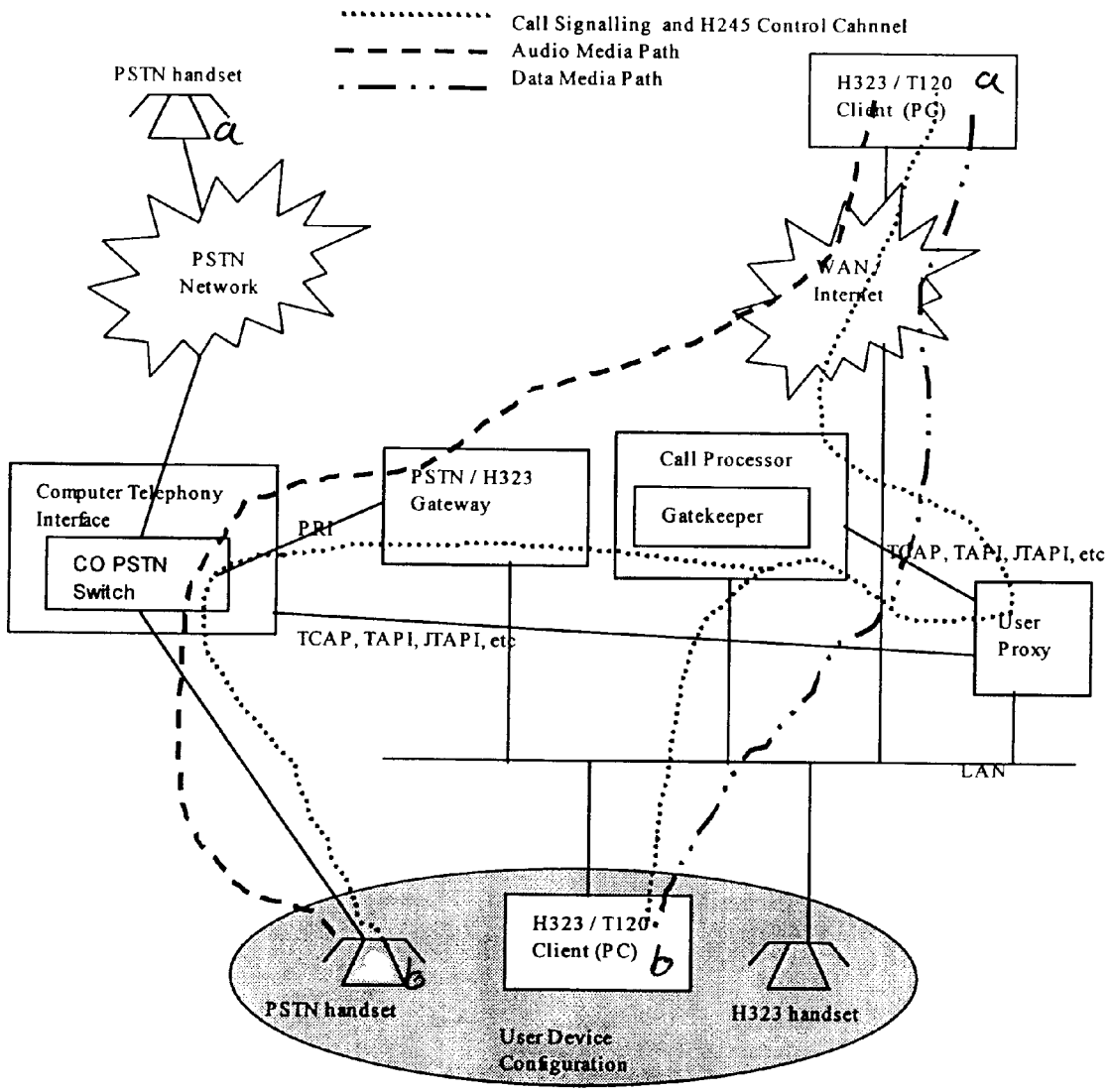
FIG. 7 is a diagram which shows the signaling paths used by the present invention in the mid-call re-routing illustrated FIG. 6.

The result is that the user of this invention is now using his/her PSTN handset as the audio device and his/her computer as the extended capability device for application sharing, file transfer, etc all within the context of the same call. FIG. 7 illustrates the signal paths that are now established as a result of the process illustrated in FIG. 6.

Hardware and Software Implementation

Figure 8:
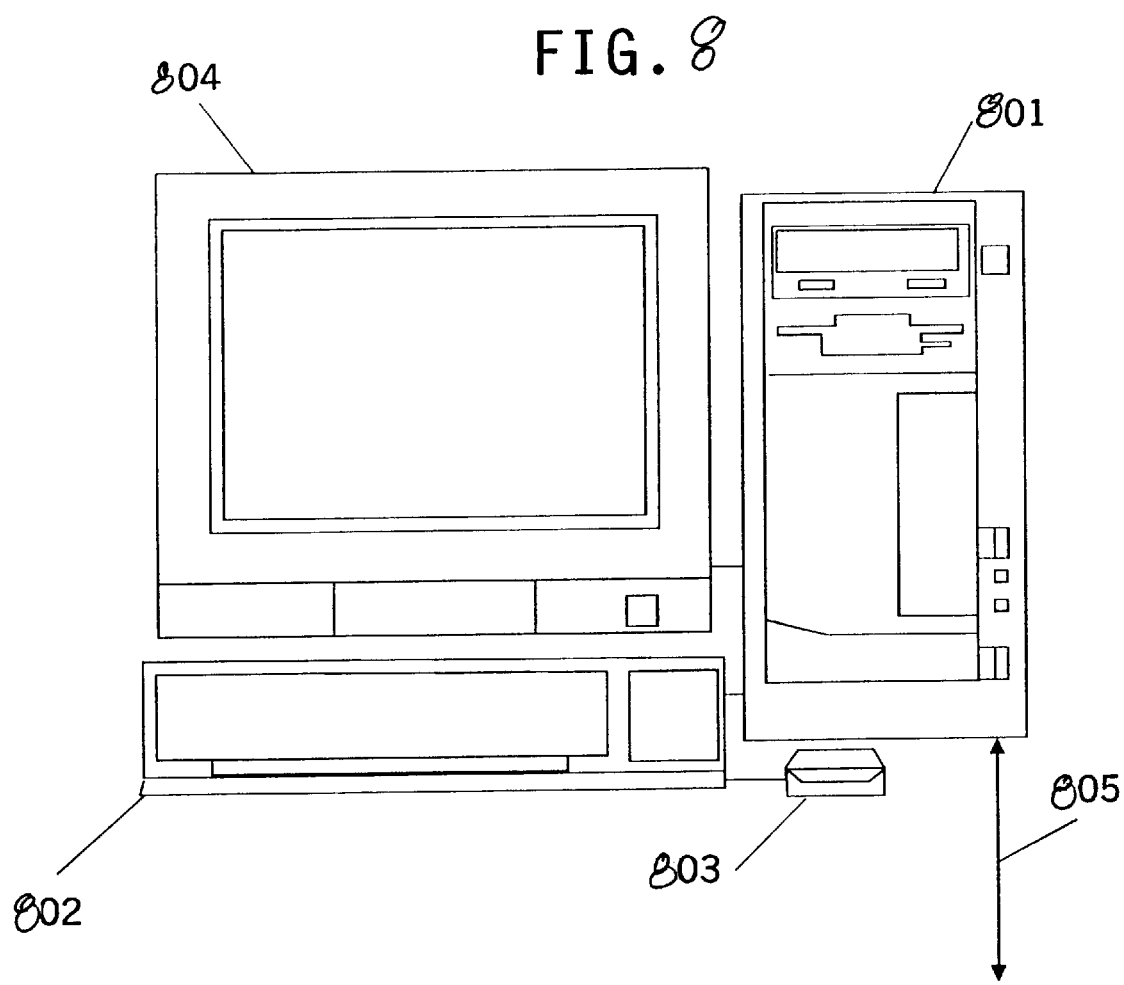
FIG. 8. is an illustration of a workstation which is used to implement some elements of the present invention.

FIG. 8 illustrates a personal computer workstation on which the software of the present invention can be operated. Input output (I/O) devices such as keyboard 802, mouse 803, and display 804. The display is used to show an operator a computer desktop on which various information is displayed. System unit 801 is connected to all of the I/O devices, and contains memory, media devices, and a central processing unit (CPU) all of which together execute the software of the present invention and cause the various software elements of the present invention to operate when the invention is in use. A network interface is normally implemented via an adapter card however for the sake of simplicity the shown graphically as interface 805. One workstation type computer as illustrated in FIG. 8 and described above my be used to implement the user proxy, call processor, and gateway of the present invention, or multiple workstations can be used to implement the various components.

Figure 9:
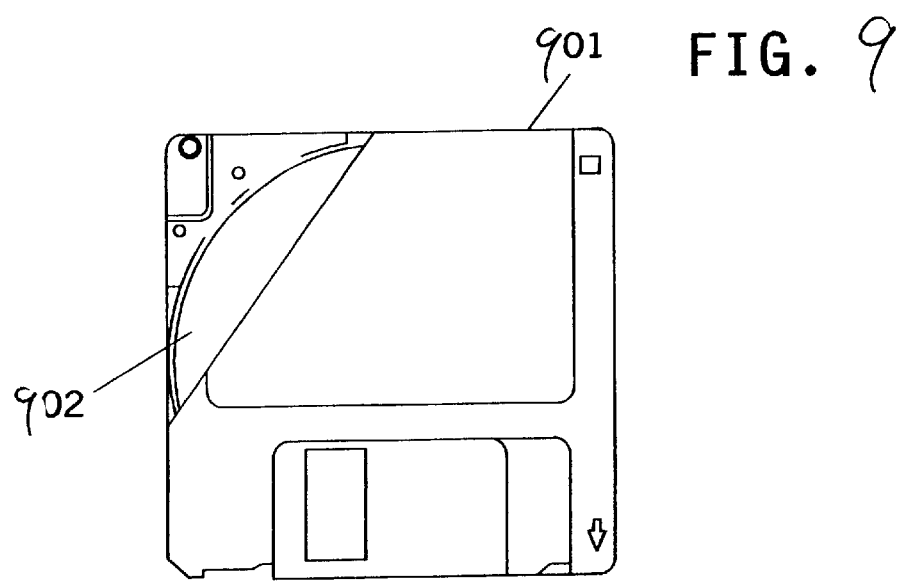
FIG. 9 is an example of a media which may be used to store computer program code which implements some elements of the present invention.

As previously mentioned, appropriate computer program code in combination with appropriate hardware implements most of the elements of the present invention. This computer program code is often stored on storage media. This media can be a diskette, hard disk, CD-ROM, or tape. The media can also be a memory storage device or collection of memory storage devices such as read-only memory (ROM) or random access memory (RAM). Additionally, the computer code can be transferred to the workstation or workstations over the Internet or some other type of network. FIG. 9 illustrates one example of a media. FIG. 9 shows a diskette of the type where magnetic media 902 is enclosed in a protective jacket 901. Magnetic field changes over the surface of the magnetic media 902 are used to encode the computer program code. In this way the computer program code is stored for later retrieval.

We have described specific embodiments of our invention as well as specific message flows which occur when the invention conducts specific operations. These embodiments and message flows are shown as an example and are not intended to limit the scope of the appended claims. One of ordinary skill in the networking and computing arts will quickly recognize that the invention has other applications in other environments. In fact, many embodiments and implementations are possible.

We claim:

1. A method of routing a multimedia call to a subscriber having a packet based communication device and a phone, said method comprising:

receiving an indication from the subscriber as to a preference for how audio communications are to be received;

receiving a call offered notification indicative of an incoming call for the subscriber;

checking the preference for how audio communications are to be received;

routing audio communications including an audio connection to either the packet based communication device or the phone based on the preference;

detecting an off hook condition at the phone of the subscriber while the multimedia call is in progress;

routing the audio communications to the phone; and closing the audio connection with the packet based communication device.

2. The method of claim 1 wherein routing audio communications to either the packet based communication device or the phone based on the preference comprises routing the audio communications to a PSTN based device.

3. The method of claim 1 wherein receiving a call offered notification indicative of an incoming call for the subscriber comprises receiving a multimedia call offered notification.

4. The method of claim 3 further comprising routing a data portion of a multimedia call resulting from the multimedia call offered notification to the packet based communication device.

5. The method of claim 1 wherein receiving an indication from the subscriber as to a preference for how audio communications are to be received comprises receiving an indication selected from the group consisting of: that all audio communications are to be routed to the phone, that all audio communications are to be routed to the packet based device, that audio only communications are to be routed to the phone, that multimedia communications including audio communications are to be routed to both the phone and the packet based device, and that multimedia communications including audio communications are to be routed to the packet based device.

6. The method of claim 1 wherein said Routing audio communications comprises routing audio communications with a user proxy.

7. The method of claim 1 further comprising storing said preference in a configuration database.

8. The method of claim 1 wherein receiving an indication from a user of a preference comprises receiving the indication in real time prior to commencement of said routing.

9. A computer program product for use in routing a multimedia call to a subscriber having a packet based communication device and a phone, said computer program product comprising software adapted to:

receive an indication from the subscriber as to a preference for how audio communications are to be received;

receive a call offered notification indicative of an incoming call for the subscriber;

check the preference for how audio communications are to be received;

route audio communications including an audio connection to either the packet based communication device or the phone based on the preference;

detect an off hook condition at the phone of the subscriber while the multimedia call is in progress;

route the audio communications to the phone; and close the audio connection with the packet based communication device.

10. The computer program product of claim 9 wherein said software adapted to route audio communications to either the packet based communication device or the phone based on the preference comprises software adapted to route the audio communications to a PSTN based device.

11. The computer program product of claim 10 wherein said software adapted to receive a call offered notification indicative of an incoming call for the subscriber comprises software adapted to receive a multimedia call offered notification.

12. The computer program product of claim 11 wherein said software is further adapted to route a data portion of a multimedia call resulting from the multimedia call offered notification to the packet based communication device.

13. The computer program product of claim 10 wherein said software adapted to receive an indication from the subscriber as to a preference for how audio communications are to be received comprises software adapted to receive an indication selected from the group consisting of: that all audio communications are to be routed to the phone, that all audio communications are to be routed to the packet based device, that audio only communications are to be routed to the phone, that multimedia communications including audio communications are to be routed to both the phone and the packet based device, and that multimedia communications including audio communications are to be routed to the packet based device.

14. The computer program product of claim 10 wherein said software adapted to route audio communications comprises software adapted to route audio communications with a user proxy.

15. The computer program product of claim 10 wherein said software is further adapted to store said preference in a configuration database.

16. The computer program product of claim 10 wherein said software adapted to receive an indication from a user of a preference comprises software adapted to receive the indication in real time.

17. Apparatus for handling routing a multimedia call to a subscriber having a packet based communication device and a phone, said apparatus comprising control logic adapted to:

receive an indication from the subscriber as to a preference for how audio communications are to be received;

receive a call offered notification indicative of an incoming call for the subscriber;

check the preference for how audio communications are to be received;

route audio communications including an audio connection to either the packet based communication device or the phone based on the preference;

detect an off hook condition of the phone of the subscriber while the multimedia call is in progress;

route the audio communications to the phone; and close the audio connection with the packet based communication device.

18. The apparatus of claim 17 wherein said control logic adapted to route audio communications to either the packet based communication device or the phone based on the preference comprises control logic adapted to route the audio communications to a PSTN based device.

19. The apparatus of claim 17 wherein said control logic adapted to receive a call offered notification indicative of an incoming call for the subscriber comprises control logic adapted to receive a multimedia call offered notification.

20. The apparatus of claim 19 wherein said control logic is further adapted to route a data portion of a multimedia call resulting from the multimedia call offered notification to the packet based communication device.

21. The apparatus of claim 17 wherein said control logic adapted to receive an indication from the subscriber as to a preference for how audio communications are to be received comprises control logic adapted to receive an indication selected from the group consisting of: that all audio communications are to be routed to the phone, that all audio communications are to be routed to the packet based device, that audio only communications are to be routed to the phone, that multimedia communications including audio communications are to be routed to both the phone and the packet based device, and that multimedia communications including audio communications are to be routed to the packet based device.

22. The apparatus of claim 17 wherein said control logic adapted to route audio communications comprises control logic adapted to route audio communications with a user proxy.

23. The apparatus of claim 17 wherein said control logic is further adapted to store said preference in a configuration database.

24. The apparatus of claim 17 wherein said control logic adapted to receive an indication from a user of a preference comprises control logic adapted to receive the indication in real time.

25. The apparatus of claim 17 further comprising a plurality of input/output devices.

26. The apparatus of claim 25 further comprising connections for a local area network and a public switched telephone network, said local area network being used by said apparatus to communicate with the packet based communication device and the public switched telephone network being used to communicate with the phone.

* * * * *